(12) United States Patent
Hu

(10) Patent No.: US 8,784,754 B2
(45) Date of Patent: Jul. 22, 2014

(54) METHOD FOR PREPARING HIGH-PURITY ALUMINA

(75) Inventor: Jae Hoon Hu, Gwangju-si (KR)

(73) Assignee: HMR Co., Ltd., Mokpo-si (KR)

( * ) Notice: Subject to any disclaimer, the term of this patent is extended or adjusted under 35 U.S.C. 154(b) by 0 days.

(21) Appl. No.: 13/641,203

(22) PCT Filed: Apr. 15, 2011

(86) PCT No.: PCT/KR2011/002717
§ 371 (c)(1),
(2), (4) Date: Nov. 6, 2012

(87) PCT Pub. No.: WO2011/129658
PCT Pub. Date: Oct. 20, 2011

(65) Prior Publication Data
US 2013/0052124 A1 Feb. 28, 2013

(30) Foreign Application Priority Data
Apr. 16, 2010 (KR) .......................... 10-2010-035065

(51) Int. Cl.
*C01F 7/00* (2006.01)
(52) U.S. Cl.
USPC ............ 423/121; 423/122; 423/127; 423/625
(58) Field of Classification Search
USPC .................................. 423/121, 122, 127, 625
See application file for complete search history.

(56) References Cited

U.S. PATENT DOCUMENTS 2,421,918 A * 6/1947 Anderson et al. ............. 423/119
2,961,297 A * 11/1960 Fenerty ......................... 423/132

FOREIGN PATENT DOCUMENTS

| JP | 10-167725 | 6/1998 |
| KR | 10-2005-0086252 | 8/2005 |
| KR | 10-2005-0094555 | 9/2005 |
| KR | 10-2005-0100985 | 10/2005 |

OTHER PUBLICATIONS

Translation of KR 1020050086252, Aug. 30, 2005.*
Translation of JP 10-167725, Jun. 23, 1998.*
International Search Report issued in PCT Application No. PCT/KR2011/002717 dated Jan. 16, 2012.

* cited by examiner

Primary Examiner — Steven Bos
(74) Attorney, Agent, or Firm — KED & Associates LLP

(57) ABSTRACT

The present invention relates to a method for preparing high-purity aluminum, the method comprising: a mother liquor preparing step for preparing a mother liquor by dissolving and aging ordinary aluminum hydroxide; a refining step for adding pulp to absorb impurities from the prepared mother liquor after the mother liquor preparing step; and an obtaining step for obtaining high-purity alumina by adding a seed into the mother liquor and precipitating a precipitate, and filtering, washing, and recrystallizing the precipitate, and calcining the precipitate. Thus, the present invention enables an environmentally-friendly and low-cost preparation of high-purity alumina.

12 Claims, 1 Drawing Sheet

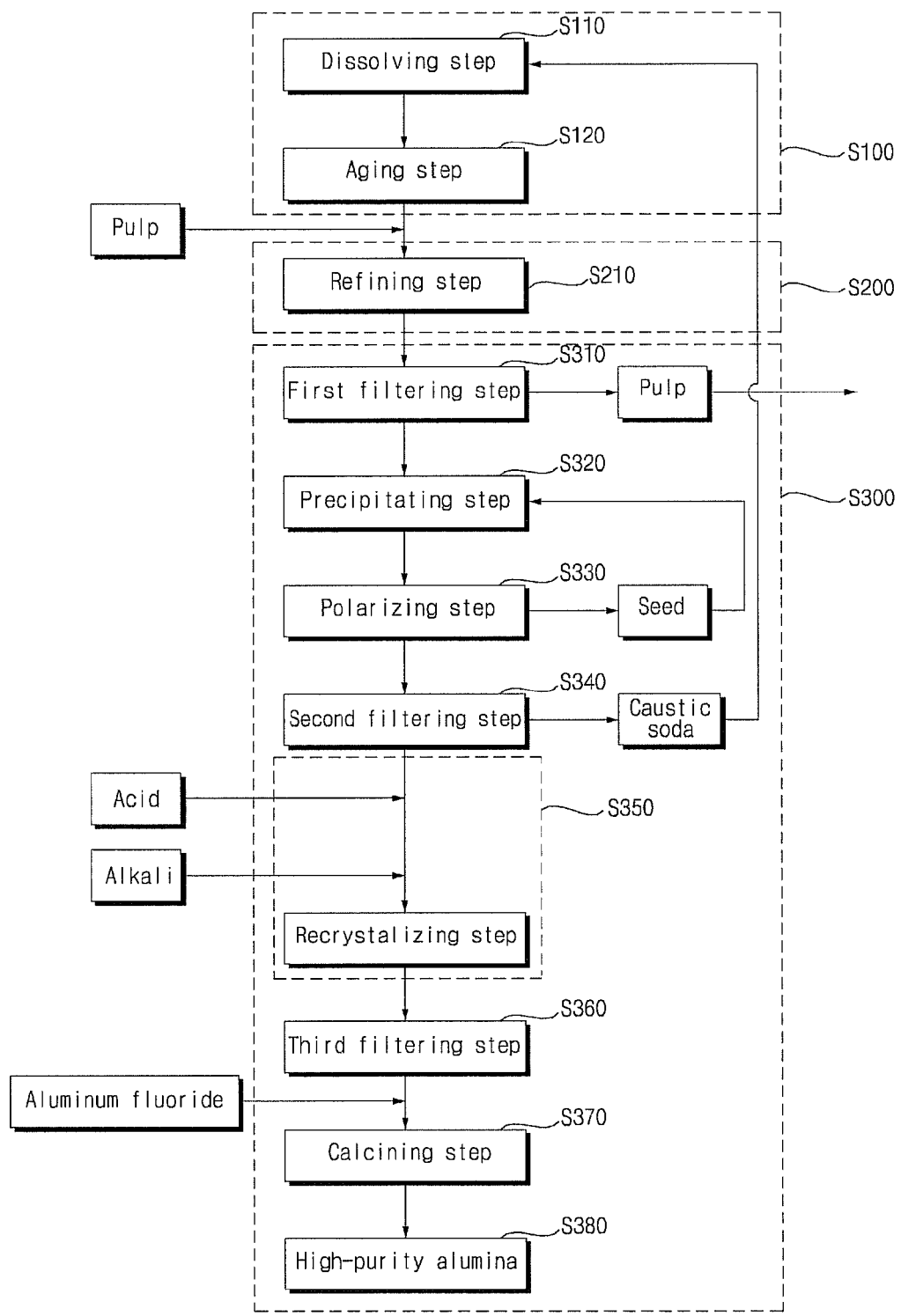

METHOD FOR PREPARING HIGH-PURITY ALUMINA

TECHNICAL FIELD

The present invention relates to a method for preparing high-purity alumina, and more particularly, to a method for preparing low-cost, high-quality and high-purity alumina by dissolving ordinary aluminum hydroxide in a caustic soda (NaOH) solution, aging the dissolved solution, selectively removing only impurities in the aged solution using a small amount of absorbent, and then preparing high-purity aluminum hydroxide using the refined solution through a Bayer process, unlike a method for preparing high-purity alumina using an aluminum or aluminum alcoxide compound as a starting material, which is an existing preparation method having difficult mass production and high-priced equipment and maintenance cost.

BACKGROUND ART

In general, a Bayer process is a process of eluting aluminum hydroxide by dissolving bauxite in a caustic soda (NaOH) solution and heating the dissolved solution (dissolving process), removing sludge and then precipitating the aluminum hydroxide dissolved in the caustic soda (precipitating process).

The aluminum hydroxide produced by the Bayer process contains a large amount of impurities due to impurities from the bauxite used in the dissolving process and residues of a sub-material used in the Bayer process. Therefore, alumina having a high degree of purity cannot be prepared by a preparation method including the Bayer process described above.

Techniques for preparing high-purity alumina, which were conventionally used, generally used a method of collecting alumina by dissolving a high-purity aluminum acid containing a small amount of impurities and recrystallizing the dissolved aluminum acid as aluminum hydroxide or vaporizing a high-purity aluminum compound at an ultra high temperature. However, the method has low mass productivity, and its manipulation is difficult. Particularly, a high-priced apparatus and material should be used. Hence, much cost is spent, and product loss, environmental contamination, etc. are caused in a preparation process.

DISCLOSURE

Technical Problem

The present invention is conceived to solve the aforementioned problems. Accordingly, an object of the present invention is to provide a method for preparing low-cost, high-quality and high-purity alumina using a high-yield and environmentally-friendly method by dissolving ordinary aluminum hydroxide in a caustic soda (NaOH) solution (dissolving step), aging the dissolved solution so as to activate impurities (aging step), absorbing the impurities in the dissolved solution using pulp (refining step), effectively refining the dissolved solution through filtering (first filtering step), preparing high-purity aluminum hydroxide using the refined solution through a Bayer process (precipitating step), and removing a small amount of impurities through a secondary refining process (third filtering step).

Technical Solution

In accordance with an aspect of the present invention, there is provided a method for preparing high-purity alumina, the method comprising: a mother liquor preparing step of preparing a mother liquor by dissolving and aging ordinary aluminum hydroxide; a refining step of adding pulp to absorb impurities from the prepared mother liquor, after the mother liquor preparing step; and an obtaining step of obtaining high-purity alumina, after the refining step, wherein the obtaining step is a step of obtaining the high-purity alumina by adding a seed into the mother liquor and precipitating a precipitate, filtering, washing and dissolving the precipitate, recrystallizing the precipitate by neutralizing the precipitate, again filtering and washing the recrystallized precipitate, mixing a small amount of aluminum fluoride ($AlF_3$) with the precipitate, and then calcining the mixed precipitate.

The mother liquor preparing step may comprise a dissolving step of preparing a mother liquor by adding a caustic soda (NaOH) solution and ordinary aluminum hydroxide into a dissolution bath and dissolving the ordinary aluminum hydroxide; and an aging step of aging impurities while slowly decreasing the temperature of the mother liquor dissolved through the dissolving step during a predetermined aging time.

In accordance with another aspect of the present invention, there is provided a method for preparing high-purity alumina, the method comprising: a dissolving step of preparing a mother liquor by adding a caustic soda (NaOH) solution and ordinary aluminum hydroxide into a dissolution bath and dissolving the ordinary aluminum hydroxide; an aging step of aging impurities while slowly decreasing the temperature of the mother liquor dissolved through the dissolving step during a predetermined aging time; a refining step of adding and dispersing an absorbent made of pulp into the mother liquor aged through the aging step, thereby absorbing the impurities in the mother liquor into the absorbent; a first filtering step of separating the pulp having the impurities absorbed thereinto, filtering the mother liquor and then providing the filtered mother liquor to a precipitation bath, after the refining step; a precipitating step of precipitating aluminum hydroxide by adding an aluminum hydroxide seed into the mother liquor of the precipitation bath, after the first filtering step; a polarizing step of separating a precipitate having a small particle size and a precipitate having a large particle size, after the precipitating step; a second filtering step of filtering the mother liquor containing the precipitate having the large particle size in the polarizing step, thereby recycling the filtered solution as the caustic soda solution; a recrystallizing step of washing the precipitate remaining in the second filtering step, dissolving aluminum hydroxide in an acid and then neutralizing the dissolved aluminum hydroxide using alkali, thereby recrystallizing the precipitate; a third filtering step of collecting the recrystallized precipitate in the recrystallizing step and filtering and washing the collected precipitate; and a calcining step of mixing aluminum fluoride ($AlF_3$) with the precipitate in the third filtering step and then calcining the mixed precipitate at 1050° C. or more for 1 hour or more.

In the dissolving step, the weight ratio of aluminum oxide to sodium carbonate ($Al_2O_3/Na_2CO_3$) in the dissolved mother liquor may be 0.68 or more.

In the dissolving step, the concentration of the caustic soda (NaOH) solution may be 230 g/l or more, based on the sodium carbonate ($Na_2CO_3$).

In the aging step, the aging temperature of the mother liquor may be maintained as 130 to 90° C. for a predetermined time or more.

In the aging step, the aging time for aging the impurities may be 1 hour or more.

The precipitating step may be performed at an initial temperature of 70° C. or more.

In the precipitating step, the precipitation time taken to precipitate the aluminum hydroxide may be 72 hours or more.

In the precipitating step, the weight ratio of aluminum oxide to sodium carbonate ($Al_2O_3/Na_2CO_3$) in the aluminum hydroxide finally obtained in the precipitating step may be 0.40 or less.

The recrystallizing step may be a step of dissolving the precipitate precipitated in the precipitating step in an acid compound selected from the group consisting of hydrochloric acid, sulfuric acid, phosphoric acid and acetic acid, and then neutralizing the dissolved precipitate using an alkali compound selected from the group consisting of caustic soda, ammonia and sodium acetate, thereby recrystallizing the precipitate.

Aluminum fluoride ($AlF_3$) of 0.3% based on the weight of a product may be mixed with a cake prepared through the recrystallizing step, and the mixed cake may be then calcined.

Advantageous Effects

In the method for preparing high-purity alumina according to the present invention, impurities are absorbed using an absorbent such as pulp, so that it is possible to prepare environmentally-friendly, high-purity alumina.

Further, it is possible to mass-prepare high-quality, low-cost and high-purity alumina by dissolving ordinary aluminum hydroxide in a caustic soda solution, aging the dissolve solution, absorbing and removing organic/inorganic impurities using a small amount of pulp, precipitating aluminum hydroxide at a high temperature so as to minimize the content of Na, dissolving the precipitated aluminum hydroxide in a weak acid, recrystallizing a precipitate, mixing a small amount of aluminum fluoride ($AlF_3$) with the recrystallized precipitate, and then calcining the mixed precipitate.

DESCRIPTION OF DRAWINGS

FIG. 1 is a block diagram illustrating sequential preparation processes in a method for preparing high-purity alumina according to the present invention.

BEST MODE

Hereinafter, a preferred embodiment of a method for preparing high-purity alumina according to the present invention will be described in detail with reference to the accompanying drawings.

FIG. 1 is a block diagram illustrating sequential preparation processes in a method for preparing high-purity alumina according to the present invention.

A sodium aluminate ($NaAlO_2$) supersaturated solution is used as a starting material so as to prepare the high-purity alumina according to the present invention. The sodium aluminate supersaturated solution is prepared by dissolving bauxite in a high-concentration caustic soda (NaOH) solution under a high-temperature and high-pressure state.

In a preferred embodiment of the method for preparing high-purity alumina according to the present invention, the high-purity alumina is prepared by aging the sodium aluminate supersaturated solution, refining the sodium aluminate solution by absorbing impurities in the sodium aluminate solution using an absorbent for absorbing the impurities, removing the absorbent having the impurities absorbed thereinto, starting precipitation of the refined sodium aluminate solution at a high temperature and precipitating a precipitate at a lower temperature through a process of slowly decreasing the temperature of the sodium aluminate solution for a long period of time, recrystallizing the precipitate by dissolving the precipitate in an acid and the neutralizing the precipitate, mixing a small amount of aluminum fluoride ($AlF_3$) with the precipitate so as to decrease an alpha-phase transition temperature and to remove sodium, and then calcining the mixed precipitate at 1050° C.

The preferred embodiment of the method for preparing high-purity alumina according to the present invention, as illustrated in FIG. 1, provides various and experimental processes for increasing the purity of the finally prepared alumina.

More specifically, the method for preparing high-purity alumina according to the preferred embodiment of the present invention, as illustrated in FIG. 1, comprises a mother liquor preparing step (S100) of dissolving ordinary aluminum hydroxide and then aging impurities so as to prepare a mother liquor, a refining step (S200) of absorbing the impurities from the prepared mother liquor by adding pulp in the mother liquor, after the mother liquor preparing step (S100), and an obtaining step (S300) of obtaining high-purity alumina after the refining step (S200).

Particularly, in the present invention, the obtaining step (S300) is only a special step of precipitating a precipitate by adding a seed into the mother liquor having the impurities removed therefrom, recrystallizing the precipitate by filtering, washing, dissolving and neutralizing the precipitate, again filtering and washing the recrystallized precipitate, mixing aluminum fluoride ($AlF_3$) with the precipitate, and then calcining the mixed precipitate.

Particularly, in the present invention, the process of recrystallizing the precipitate in the obtaining step (S300) is only a special process for reducing the content of Na that is one of the impurities. The process of recrystallizing the precipitate will be described in detail later.

Meanwhile, the refining step 200 is characterized by absorbing impurities using an absorbent such as pulp, in place of a conventional co-precipitation method of co-precipitating impurities in mother liquor together with an aluminum hydroxide seed.

Here, the mother liquor preparing step (S100) comprises the mother liquor preparation step (S100) comprises a dissolving step (S110) of preparing a mother liquor by adding ordinary aluminum hydroxide and caustic soda (NaOH) into a dissolution bath and dissolving the ordinary aluminum hydroxide, and an aging step (S120) of aging impurities while slowly decreasing the temperature of the mother liquor in which the ordinary aluminum hydroxide is dissolved through the dissolving step (S110) during a predetermined aging time.

In the method for preparing high-purity alumina according to the present invention, the most important feature is the obtaining step (S300), but other subdivided processes also have important conditions in the preparation of the high-purity alumina. Therefore, it should be noted that the scope of the present invention is not limited by the embodiment described above.

For example, in another embodiment of the method for preparing high-purity alumina according to the present invention, final alumina can be obtained by undergoing processes more minutely subdivided than the embodiment described above under more detailed conditions.

That is, another embodiment of the method for preparing high-purity alumina, as illustrated in FIG. 1, comprises a dissolving step (S110) of preparing a mother liquor by adding a caustic soda (NaOH) solution and ordinary aluminum hydroxide into a dissolution bath and dissolving the ordinary aluminum hydroxide, an aging step (S120) of aging impurities while slowly decreasing the temperature of the mother liquor dissolved through the dissolving step (S110) during a predetermined aging time, a refining process (S210) of adding an absorbent made of pulp in the mother liquor aged through the aging step (S110) and dispersing the absorbent, thereby absorbing the impurities in the mother liquor into the absorbent, a first filtering step (S310) of separating the pulp absorbing the impurities after the refining step (S210), filtering the mother liquor and providing the mother liquor to a precipitation bath, a precipitating step (S320) of precipitating aluminum hydroxide by adding an aluminum hydroxide seed into the mother liquor of the precipitation bath after the first filtering step (S310), a polarizing step (S330) of separating a precipitate having a small particle size and a precipitate having a large particle size, after the precipitating step (S320), a second filtering step (S340) of filtering the mother liquor containing the precipitate having the large particle size in the polarizing step (S330), thereby recycling the filtered solution as the caustic soda solution, a recrystallizing step (S350) of recrystallizing the precipitate by washing the precipitate remaining in the second filtering step (S340), dissolving aluminum hydroxide in an acid and the neutralizing the aluminum hydroxide using alkali, a third filtering step (S360) of collecting the precipitate recrystallized in the recrystallizing step (S350) and filtering and washing the collected precipitate, and a calcining step (S370) of mixing aluminum fluoride ($AlF_3$) with the precipitate in the third filtering step (S360) and then calcining the mixed precipitate at 1050° C. or more for 1 hour or more.

The method for preparing high-purity alumina according to the present invention, configured as described above, will be described in detailed manner.

First, to prepare a sodium aluminate mother liquor, a caustic soda (NaOH) solution prepared to be 210 to 280 g/l based on sodium carbonate ($Na_2CO_3$) is added into a dissolution bath made of stainless steel (SUS 316L) of which temperature can be increased, and ordinary aluminum hydroxide containing moisture is added in the caustic soda solution so that the weight ratio (A/C) of $Al_2O_3/Na_2CO_3$ becomes 0.68 to 0.74. Subsequently, the temperature of the dissolution bath is increased while agitating the sodium aluminate solution at an agitation speed of 30 RPM so as to disperse the aluminum hydroxide, and then maintained for about 10 minutes (dissolving step (S110)).

To prepare the mother liquor in which the aluminum hydroxide is completely dissolved in the state in which the weight ratio (A/C) of $Al_2O_3/Na_2CO_3$ is 0.70 as shown in the following Tables 1 and 2, the applicant added the caustic soda into the dissolution bath so that the concentration of the caustic soda became 270 g/l based on the sodium carbonate ($Na_2CO_3$), and increased the temperature of the dissolution bath up to 125° C. Then, the temperature was maintained for about 10 minutes in this state.

As such, in the state in which the aluminum hydroxide was completely dissolved so that the A/C of the mother liquor became 0.70, the applicant agitated the mother liquor by slowly operating an agitator at an agitation speed of 3 RPM so as to age the mother liquor, and aged the mother liquor by slowly decreasing the temperature of the mother liquor to 100° C. over 1 hour. Here, the reason for aging the mother liquor is that, as described above, the particle size of the impurities is increased so that the impurities contained in the mother liquor are easily removed (aging step (S120)).

TABLE 1

| Product ingredient | A/C | | | | | | | |
|---|---|---|---|---|---|---|---|---|
| | 0.62 | 0.64 | 0.66 | 0.68 | 0.70 | 0.72 | 0.74 | Remark |
| Fe (ppm) | 14 | 11 | 7 | 4 | 4 | 2 | 2 | |
| Ca (ppm) | 8 | 7 | 4 | 3 | 2 | 2 | 2 | |

Influence of product according to weight ratio of $Al_2O_3/Na_2CO_3$ of mother liquor

TABLE 2

| Product ingredient | $Na_2CO_3$ (g/l) | | | | | | | |
|---|---|---|---|---|---|---|---|---|
| | 210 | 220 | 230 | 240 | 250 | 260 | 270 | 280 |
| Fe (ppm) | 13 | 12 | 10 | 9 | 5 | 3 | 2 | 2 |
| Ca (ppm) | 8 | 8 | 6 | 4 | 4 | 2 | 2 | 2 |
| Na (ppm) | 28 | 17 | 12 | 8 | 6 | 6 | 5 | 5 |

Influence of product according to concentration of caustic soda (NaOH) of mother liquor ($Al_2O_3/Na_2CO_3$: 0.70)

Meanwhile, the applicant has found that, as can be seen with reference to the relationship between contents of the impurities according to the aging time in the aging step (S120), the A/C of the mother liquor is 0.70, and the most suitable aging time under the condition that the concentration of the caustic soda is 270 g/l based on the sodium carbonate should be maintained for 1 hour or more. However, the A/C of the mother liquor is not necessarily 0.70 Preferably, if the A/C of the mother liquor is 0.68 or more as illustrated in Table 1, the content of the impurities (Fe and Na) is lowest, and thus the A/C of the mother liquor may be employed as 0.68 or more. More preferably, the A/C of the mother liquor may be employed in a range of 0.68 to 0.70 as illustrated in Table 1.

TABLE 3

| Ingredient | Aging time (min) | | | | | |
|---|---|---|---|---|---|---|
| | 30 | 60 | 120 | 180 | 240 | 300 |
| Fe (ppm) | 13 | 2 | 2 | 2 | 2 | 2 |
| Ca (ppm) | 6 | 2 | 2 | 2 | 2 | 2 |

Relationship between contents of impurities of high-purity alumina product according to aging time of mother liquor Next, to remove the impurities contained in the mother liquor, pulp corresponding to 1 g per liter, which is a condition that has the best productivity per liter and the highest impurity removal rate as shown in Tables 4 and 5, is added in the well-aged mother liquor, and the speed of the agitator is increased to a speed of 5 RPM as shown in Table 6. Then, the impurities are absorbed in the pulp for 10 minutes by dispersing the pulp in the mother liquor (aging process (S210)).

TABLE 4

| Ingredient of mother liquor after filtering | Amount of pulp used (g/l) | | | | | | | | |
|---|---|---|---|---|---|---|---|---|---|
| | 0 | 0.2 | 0.4 | 0.6 | 0.8 | 1.0 | 1.5 | 2 | 3 |
| $Al_2O_3/Na_2CO_3$ | 0.70 | 0.70 | 0.70 | 0.70 | 0.70 | 0.70 | 0.70 | 0.70 | 0.70 |
| Fe (ppm) | 11 | 8 | 5 | 4 | 3 | 2 | 2 | 2 | 2 |
| Ca (ppm) | 5 | 1 | 1 | 1 | 1 | 1 | 1 | 1 | 1 |

Influence of mother liquor according to amount of absorbent pulp for removing impurities in mother liquor (Temperature of mother liquor: 100° C., Agitation speed: 5 RPM, Agitation time: 10 minutes)

TABLE 5

| Ingredient | Agitation speed | | | | | | |
|---|---|---|---|---|---|---|---|
| | 0 rpm | 2 rpm | 4 rpm | 6 rpm | 8 rpm | 10 rpm | 12 rpm |
| A/C of mother liquor | 0.70 | 0.70 | 0.70 | 0.70 | 0.70 | 0.70 | 0.70 |
| Content of Fe (ppm) of mother liquor after injecting pulp | 14 | 7 | 2 | 2 | 2 | 2 | 2 |

Change in mother liquor according to speed (RPM) of agitator during reaction time of 10 minutes

TABLE 6

| Ingredient | Reaction time (min) | | | | | |
|---|---|---|---|---|---|---|
| | 0 | 5 | 10 | 15 | 20 | 25 |
| A/C of mother liquor after filtering | 0.70 | 0.70 | 0.70 | 0.70 | 0.70 | 0.70 |
| Fe (ppm) | 14 | 3 | 2 | 2 | 2 | 2 |
| Ca (ppm) | 7 | 2 | 2 | 2 | 2 | 2 |

Change in mother liquor according to absorption time (Temperature: 95° C., Amount of pulp used: 1 g/l, Agitation speed: 5 RPM)

Meanwhile, the pulp absorbing the impurities from the mother liquor is removed in the first filtering step (S310) that is a next step. Here, the mother liquor is filtered under a pressure of 2 atmospheres, using a filter press to which filter clothes made of poly ethylene with a filtering area of 25 cm×25 cm per 1 m³ is attached, so as to remove the pulp. The pure mother liquor having the impurities removed therefrom is provided to a precipitation bath for the purpose of the precipitating step that is a next step, and the pulp absorbing the impurities is cleansed and then processed as recyclable waste (first filtering step (S310)).

Next, the refined mother liquor having the impurities removed therefrom undergoes the precipitating step. At this time, the mother liquor is in a state in which the weight ratio of $Al_2O_3/Na_2CO_3$ is 0.69, and the temperature is maintained as 90° C. In the precipitating step, the speed of the agitator is increased to 15 RPM so that a precipitate and a seed rise to the surface of the mother liquor, and precipitation is started at 90° C. or more as shown in Table 7 by adding an aluminum hydroxide seed (average particle size: 30 μm) of 40 g per 1 L of the mother liquor so as to assist the precipitation. As shown in Table 8, the precipitation time is maintained as 72 hours or more (precipitating step (S320)).

TABLE 7

| Ingredient | Temperature of initial precipitation (° C.) | | | | | |
|---|---|---|---|---|---|---|
| | 90° C. | 85° C. | 80° C. | 75° C. | 70° C. | 65° C. |
| Na wt % contained in precipitation | 0.02 | 0.02 | 0.04 | 0.08 | 0.15 | 0.30 |

% content of Na of precipitation according to temperature of initial precipitation (Precipitation time: 72 hours)

TABLE 8

| Ingredient | Time (hr) | | | | | | | |
|---|---|---|---|---|---|---|---|---|
| | 48 | 60 | 72 | 84 | 96 | 108 | 120 | 132 |
| Weight ratio of final mother liquor | 0.38 | 0.36 | 0.34 | 0.34 | 0.33 | 0.33 | 0.33 | 0.32 |
| % content of Na contained in Precipitation | 0.21 | 0.10 | 0.02 | 0.02 | 0.02 | 0.02 | 0.02 | 0.02 |

Content of Na of precipitation according to precipitation time & weight ratio of $Al_2O_3/Na_2CO_3$ of final mother liquor after precipitation (Final precipitation temperature: 40° C., Initial precipitation temperature: 90° C., Seed: 65 g/l, Average particle size: 40 μm)

The precipitate precipitated through the precipitating step becomes high-purity alumina of which impurity content ratio is decreased as the content of the caustic soda (NaOH) is minimized. As the precipitation condition that can minimize the content of the caustic soda, the applicant has found that in a case where the initial precipitation temperature is 90° C., the final precipitation temperature is 40° C., and the precipitation time is 72 hours or more as shown in Tables 7 and 8, the weight ratio (A/C) of $Al_2O_3/Na_2CO_3$ of the final precipitated solution is 0.34 or less. As such, in a case where the weight ratio (A/C) of the final precipitated solution is 0.34 or less, the condition has quality and competitiveness.

Next, if the precipitating step is finished, the polarizing step (S330) is started. In the polarizing step (S330), a precipitate having an average particle size of 30 μm or less among incompletely grown precipitates are separated using a cyclone polarizer, and the separated precipitate is used as an aluminum hydroxide seed provided in the precipitating step (S320). A precipitate having completely grown particles (average particle size: 60 μm) undergoes the second filtering step (S340) (polarizing step (S330)).

After the polarizing step (S330), the completely grown precipitate having the average particle size of 60 μm is separated into a solid substance and filtered solution, and the filtered solution is then recycled as the caustic soda solution required in the dissolving step (S110) (second filtering step (S340)). The precipitate that is high-purity aluminum hydroxide is washed with pure water having a temperature of 80° C. or more and then added into a weak acid (preferably 10% dilute sulfuric acid) compound, thereby completely dissolving the precipitate. Then, the dissolved precipitate is recrystallized by neutralizing the precipitate using a weak alkali (preferably 10% ammonia water) compound (recrystallizing step (S350)). Then, a cake that is a white solid substance is obtained by filtering and washing the recrystallized precipitate (third filtering step (S360)). As illustrated in Table 9, 1% aluminum fluoride ($AlF_3$) (based on the weight of an aluminum product) is mixed with the white solid substance, and the mixed substance is calcined at 1050° C. for 1 hour (calcining step (S370)), thereby preparing high-purity alumina (S380).

TABLE 9

|  | Product vs amount of $AlF_3$ used | | | | | |
|---|---|---|---|---|---|---|
| Ingredient | 0 | 0.5 | 1 | 1.5 | 2 | 2.5 |
| Na (ppm) contained in product | 7 | 6 | 5 | 5 | 5 | 5 |

Content of Na impurity contained in high-purity alumina according to amount of $AlF_3$ used The high-purity alumina obtained by drying the precipitate is finally packaged (packaging step (S380)).

TABLE 10

| Ingredient | Kind | |
|---|---|---|
|  | High-purity alumina prepared according to present invention | Conventional high-purity alumina |
| $Al_2O_3$% | 99.995 | 99.99 |
| Na ppm | <5 | <10 |
| Fe ppm | <3 | <5 |
| Si ppm | <2 | <10 |
| Ti ppm | <2 | <3 |
| Mg ppm | <1 | <2 |
| Ca ppm | <1 | <2 |

Comparison of high-purity alumina prepared according to present invention with conventional high-purity alumina Although the preferred embodiment and other embodiments of the method for preparing high-purity alumina according to the present invention has been explained in detail with reference to the accompanying drawings. However, the embodiments of the present invention are not limited thereto, and it will be apparent that various modifications and other embodiments are possible within the scope of the invention. Accordingly, the substantial scope of the invention shall be determined only by the appended claims and their equivalents.

The invention claimed is:

1. A method for high-purity alumina, the method comprising:
a mother liquor preparing step of preparing a mother liquor by dissolving and aging aluminum hydroxide;
a refining step of adding pulp to absorb impurities from the prepared mother liquor, after the mother liquor preparing step to form refined mother liquor; and
an obtaining step of obtaining high-purity alumina, after the refining step,
wherein the obtaining step is a step of obtaining the high-purity alumina by adding a seed to the refined mother liquor to form a precipitate, filtering, washing and dissolving the precipitate, recrystallizing the dissolved precipitate by neutralizing the dissolved precipitate, again filtering and washing the recrystallized precipitate, mixing a small amount of aluminum fluoride ($AlF_3$) with the washed recrystallized precipitate, and then calcining the mixed precipitate.

2. The method of claim 1, wherein the mother liquor preparing step comprising:
a dissolving step of preparing a mother liquor by adding a caustic soda (NaOH) solution and aluminum hydroxide into a dissolution bath and dissolving the aluminum hydroxide; and
an aging step of aging impurities while slowly decreasing a temperature of the mother liquor dissolved through the dissolving step of preparing the mother liquor during a predetermined aging time.

3. A method for high-purity alumina, the method comprising:
a dissolving step of preparing a mother liquor by adding a caustic soda (NaOH) solution and aluminum hydroxide into a dissolution bath and dissolving the aluminum hydroxide;
an aging step of aging impurities while slowly decreasing a temperature of the mother liquor dissolved through the dissolving step during a predetermined aging time;
a refining step of adding and dispersing an absorbent made of pulp into the mother liquor aged through the aging step, thereby absorbing the impurities in the mother liquor into the absorbent;
a first filtering step of separating the pulp having the impurities absorbed thereinto, filtering the mother liquor and then providing the filtered mother liquor to a precipitation bath, after the refining step;
a precipitating step of precipitating aluminum hydroxide by adding an aluminum hydroxide seed into the mother liquor of the precipitation bath, after the first filtering step;
a polarizing step of separating a precipitate having a small particle size and a precipitate having a large particle size, after the precipitating step;
a second filtering step of filtering the mother liquor containing the precipitate having the large particle size in the polarizing step, thereby recycling the filtered mother liquor as the caustic soda solution;
a recrystalizing step of washing the precipitate remaining in the second filtering step, dissolving aluminum hydroxide in an acid and then neutralizing the dissolved aluminum hydroxide using alkali, thereby recrystallizing the precipitate;
a third filtering step of collecting the recrystalized precipitate in the recrystalizing step and filtering and washing the collected precipitate; and
a calcining step of mixing aluminum fluoride ($AlF_3$) with the collected precipitate washed in the third filtering step and then calcining the mixed precipitate at 1050° C. or more for 1 hour or more.

4. The method of claim 2, wherein, in the dissolving step, the weight ratio of aluminum oxide to sodium carbonate ($Al_2O_3/Na_2CO_3$) in the dissolved mother liquor is 0.68 or more.

5. The method of claim 2, wherein, in the dissolving step, the concentration of the caustic soda (NaOH) solution is 230 g/l or more, based on the sodium carbonate ($Na_2CO_3$).

6. The method of claim 2 , wherein, in the aging step, the aging temperature of the mother liquor is maintained at 90° C. to 130° C.

7. The method of claim 6, wherein, in the aging step, the aging time for aging the impurities is 1 hour or more.

8. The method of claim 3, wherein the precipitating step is performed at an initial temperature of 70° C. or more.

9. The method of claim 3, wherein, in the precipitating step, the precipitation time taken to precipitate the aluminum hydroxide is 72 hours or more.

10. The method of claim 3, wherein, in the precipitating step, the weight ratio of aluminum oxide to sodium carbonate ($Al_2O_3/Na_2CO_3$) in the aluminum hydroxide finally obtained in the precipitating step is 0.40 or less.

11. The method of claim 3, wherein the recrystalizing step is a step of dissolving the precipitate precipitated in the precipitating step in an acid compound selected from the group consisting of hydrochloric acid, sulfuric acid, phosphoric acid and acetic acid, and then neutralizing the dissolved precipitate using an alkali compound selected from the group consisting of caustic soda, ammonia and sodium acetate, thereby recrystalizing the precipitate.

12. The method of claim 11, wherein aluminum fluoride ($AlF_3$) of 0.3% based on the weight of a product is mixed with a cake prepared in the recrystalizing step, and the mixed cake is then calcined.

* * * * *